(12) United States Patent
Wolf

(10) Patent No.: US 6,735,893 B2
(45) Date of Patent: May 18, 2004

(54) SIGN FOR A VEHICLE AND PROCESS OF USING SIGN

(75) Inventor: Erhard Wolf, Stuttgart (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/418,053

(22) Filed: Apr. 18, 2003

(65) Prior Publication Data

US 2003/0200684 A1 Oct. 30, 2003

(30) Foreign Application Priority Data

Apr. 24, 2002 (DE) ......................................... 102 18 250
Dec. 5, 2002 (DE) ......................................... 102 56 721

(51) Int. Cl.⁷ ............................................. G09F 21/04
(52) U.S. Cl. ............................. 40/591; 40/556; 40/552; 362/496; 362/800

(58) Field of Search ........................... 40/591, 556, 541, 40/552; 362/487, 496, 505, 506, 800, 812

(56) References Cited

U.S. PATENT DOCUMENTS

| | | | | |
|---|---|---|---|---|
| 4,879,826 A | * | 11/1989 | Wittke | 40/591 |
| 4,977,695 A | * | 12/1990 | Armbruster | 40/541 |
| 5,029,053 A | * | 7/1991 | Solow | 362/497 |
| 5,150,960 A | * | 9/1992 | Redick | 362/497 |
| 5,150,961 A | * | 9/1992 | Gonzalez | 362/497 |

* cited by examiner

*Primary Examiner*—Gary Hoge
(74) *Attorney, Agent, or Firm*—Crowell & Moring LLP

(57) ABSTRACT

A sign for a vehicle has a three-dimensional base equipped with an opaque surface coating, and a backside of the base is placed on and attached to a vehicle part. The sign is equipped with an indirect lighting device so as to allow recognition of the sign at dawn or dusk or in the dark.

25 Claims, 3 Drawing Sheets

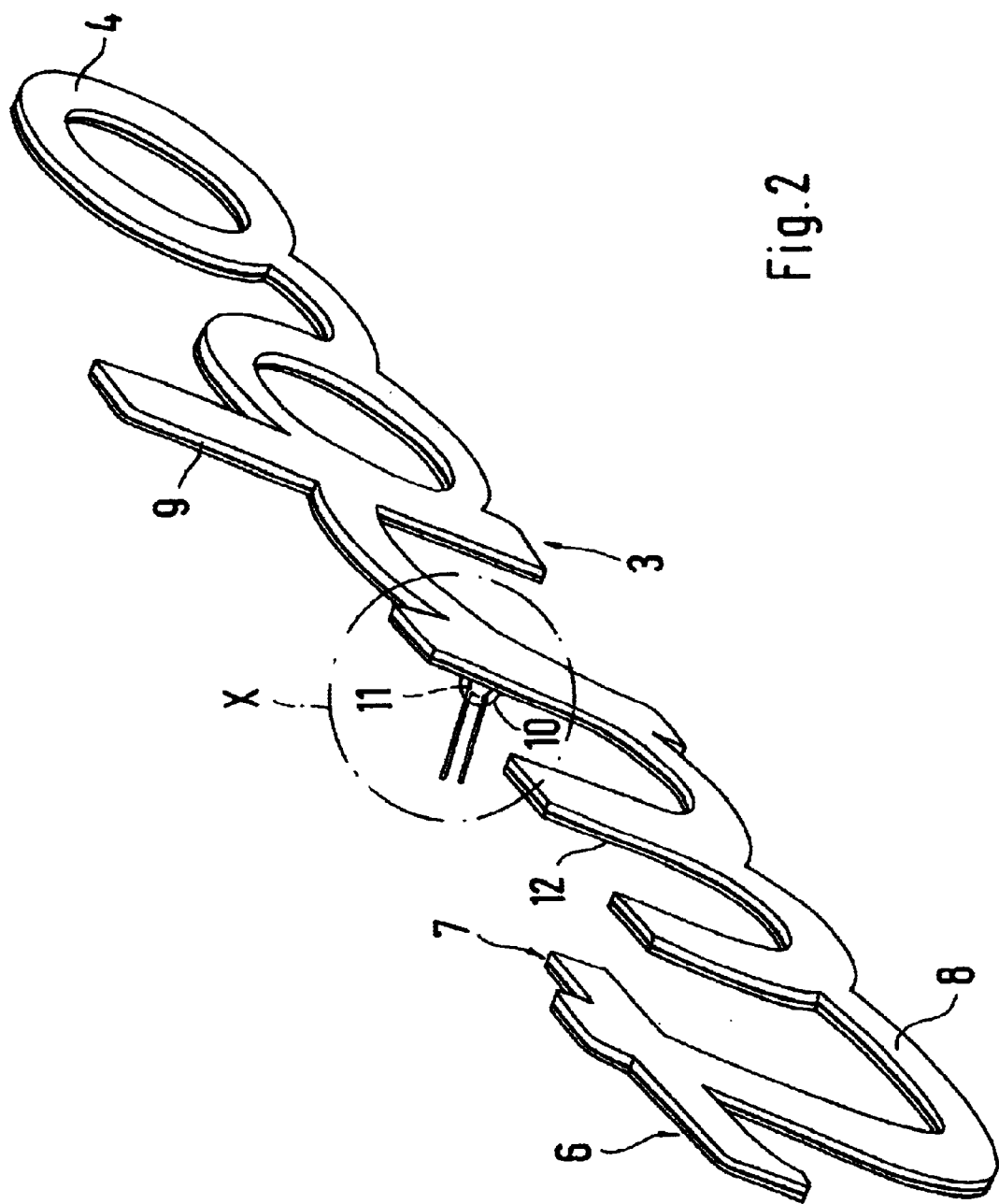

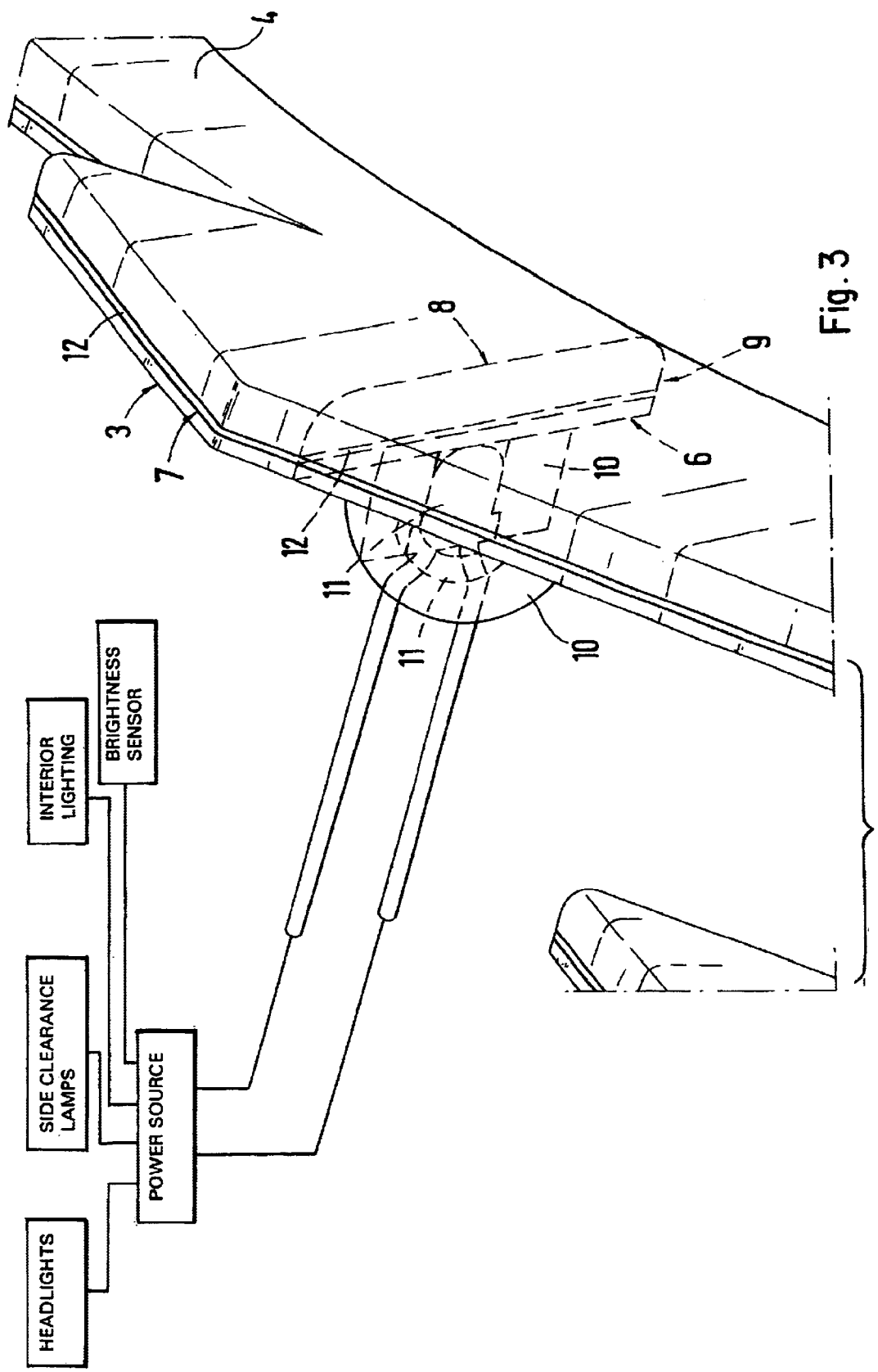

SIGN FOR A VEHICLE AND PROCESS OF USING SIGN

This application claims the priorities of German applications 102 18 250.7, filed Apr. 24, 2002, and 102 56 721.2, filed Dec. 5, 2002, the disclosures of which are expressly incorporated by reference herein.

BACKGROUND AND SUMMARY OF THE INVENTION

The present invention relates to a sign for a vehicle that comprises a three-dimensional base equipped with an opaque surface coating, wherein the backside of the sign is placed and attached to a vehicle part. The invention also concerns a process of using such a sign.

Signs of the above-mentioned kind are conventionally manufactured from aluminum or opaque plastic and equipped with a continuous opaque surface coating. Attachment of the signs to a specified vehicle part in the passenger compartment or on the vehicle exterior occurs through adhesion, clipping, screwing, or in similar ways. Such signs have the disadvantage that they can no longer be recognized at dawn or dusk or in the dark.

One object of the invention is to make such provisions to a sign that it can also be recognized at dawn or dusk or in the dark.

This object is achieved according to the invention by way of an indirect lighting device with which the sign is equipped. The dependent claims contain further features that provide beneficial designs of the invention.

Advantages achieved through the invention include creation of a sign with virtual indirect lighting which, on one hand, can be recognized at dawn or dusk or in the dark and, on the other hand, does not blind other drivers. Signs arranged on the vehicle exterior contribute to increased safety since broken-down vehicles can be recognized more quickly in the dark. Additionally, the lighted signs represent an aesthetically appealing design. The lighted signs include a three-dimensional base made of translucent plastic such as ABS or polycarbonate and have a galvanized or painted surface coating on which at least one peripheral side contour is formed through the local use of a laser on the surface coating. The contour has a small width. A hollow cylinder is molded to the backside of the sign to hold a light-emitting diode, wherein the light-emitting diode is connected to a power source. The power source for the sign can be activated when switching on the headlights, when turning on the side clearance lamps, when braking, or in similar fashions so that easier identification of the vehicle manufacturer or vehicle type is guaranteed even in the dark.

A design of the invention is depicted in the drawing and is more closely described in the following.

BRIEF DESCRIPTION OF THE DRAWINGS

FIG. 2 is a view of the sign in perspective, and

FIG. 3 is an enlarged view of a detail X from FIG. 2.

DETAILED DESCRIPTION OF THE INVENTION

Figure 1:
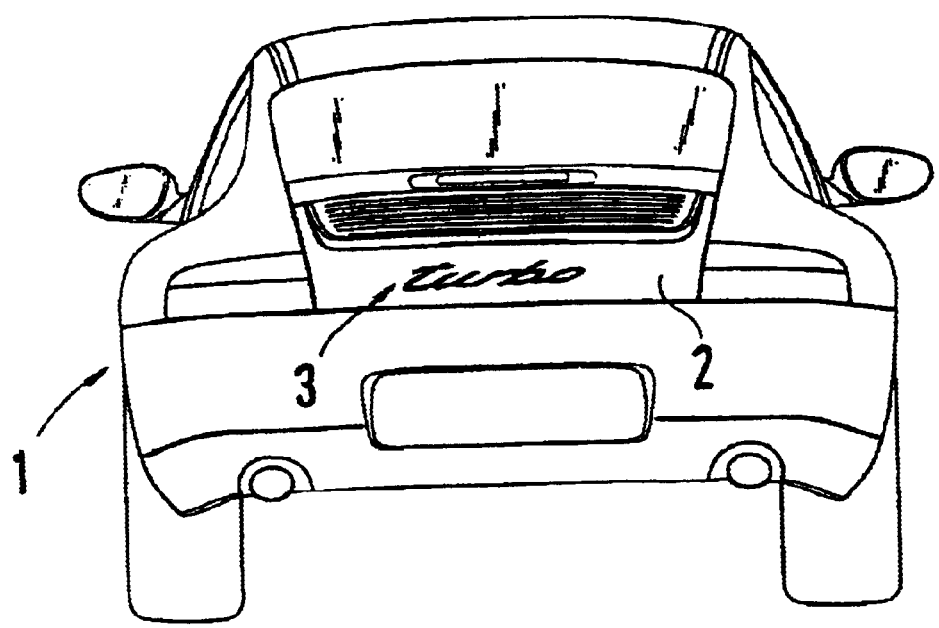
FIG. 1 is a view from the rear of a vehicle with a sign.

In FIG. 1, the tail of a passenger car 1 is shown. On one of the tail vehicle parts 2 forming the vehicle exterior, a three-dimensional exterior sign 3 is provided. However, the sign 3 can also be positioned in the front area, on the side surfaces or in the interior of the passenger car 1 on a design or body part.

The sign 3 comprises a three-dimensional base 5 equipped with an opaque surface coating 4, wherein the back 6 of the base 5 is placed on and attached to the exterior of the vehicle part 2.

Fastening can occur through adhesion, screwing, clipping or in a similar fashion as well as through a combination of these fastening procedures. The surface coating 4 is formed by a galvanized layer or a paint coating and preferably covers the entire base 5. The sign 3 is formed through an adjoining letter and/or number sequence, a manufacturer's emblem or the like. According to the invention, the sign 3 is equipped with an indirect lighting device 7. The indirect lighting device 7 affects a lateral surface edge 9 arranged between the back 6 and the visible front side 8 of the three-dimensional base 5, wherein the surface edge 9 is aligned approximately vertically to the back 6. For the purpose of forming the indirect lighting 7, the base 5 consists of a continuous translucent plastic material, for example ABS, polycarbonate or the like.

In the design, at least one hollow cylinder 10 for holding a light-emitting diode 11, which is actively connected with a power source that is not described in detail, is molded to the rear 6 of the base 5. Within the intended lateral beam range of the indirect lighting device 7, the surface coating 4 of the sign 3 is locally removed in such a way that at least one peripheral ring-shaped closed contour 12 is formed so that a narrow peripheral beam is formed when the light-emitting diode 11 is switched on. In the design, the surface coating 4 is removed by a laser. The surface coating 4 can, however, also be removed locally through other procedures. At least one peripheral contour 12 has a small consistent width along its longitudinal extension. In the design, a width of approx. 0.2±0.1 mm is specified. However, the width can also be wider.

According to FIG. 3, the peripheral contour 12 runs on the lateral surface edge 9 of the sign 3, specifically preferably adjacent to the back 6. The contour 12 can be provided on the inner or outer side of the letters or numbers.

Triggering of the power source can be developed in such a way that the power source is activated when switching on the headlights, the side clearance lamps, the interior lighting, when braking, or in dependency upon a brightness sensor. The indirect lighting device 7 conveys to the sign 3 a visually appealing look. Through the lighted sign 3, the automobile manufacturer or automobile type can be recognized, even in the dark, and parked vehicles will be noticed more quickly in the dark when the sign 3 is lighted, contributing to increased traffic safety.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. A sign for a vehicle comprising:
   a three-dimensional base equipped with an opaque surface coating, a rear side of the base being placeable on and directly attachable to a vehicle part, and
   an indirect lighting device with which the sign is equipped.

2. The sign according to claim 1, wherein the indirect lighting device affects a peripheral surface edge that is arranged between the rear side and a front side of the three-dimensional base.

3. The sign according to claim 2, wherein the at least one peripheral contour runs adjacent to the rear side of the base on the peripheral surface edge.

4. The sign according to claim 3, wherein a power source is activated when switching on headlights, when switching on side clearance lamps, when switching on interior lighting, when braking, or in dependency upon a brightness sensor.

5. The sign according to claim 2, wherein the base has a galvanized or painted surface coating.

6. The sign according to claim 2, wherein a power source is activated when switching on headlights, when switching on side clearance lamps, when switching on interior lighting, when braking, or in dependency upon a brightness sensor.

7. The sign according to claim 1, wherein the base has a galvanized or painted surface coating.

8. The sign according to claim 7, wherein a power source is activated when switching on headlights, when switching on side clearance lamps, when switching on interior lighting, when braking, or in dependency upon a brightness sensor.

9. The sign according to claim 1, wherein a power source is activated when switching on headlights, when switching on side clearance lamps, when switching on interior lighting, when braking, or in dependency upon a brightness sensor.

10. A sign according to claim 1, for a vehicle comprising:
    a three-dimensional base equipped with an opaque surface coating, a rear side of the base being placeable on and attachable to a vehicle part, and
    an indirect lighting device with which the sign is equipped,
    wherein, for forming the indirect lighting device, the base is formed of translucent plastic material,
    wherein, at the rear side of the base, at least one light-emitting diode is arranged, and
    wherein the surface coating is removed in some areas in such a way that at least one peripheral ring-shaped closed contour is formed so that a beam is formed when the at least one light-emitting diode is switched on.

11. The sign according to claim 10, wherein the at least one peripheral contour is formed through local use of a laser on the surface coating.

12. The sign according to claim 11, wherein the base is manufactured from translucent ABS or polycarbonate.

13. The sign according to claim 11, wherein a power source is activated when switching on headlights, when switching on side clearance lamps, when switching on interior lighting, when braking, or in dependency upon a brightness sensor.

14. The sign according to claim 10, wherein the at least one peripheral contour has a relatively narrow width along its longitudinal extension.

15. The sign according to claim 14, wherein the base is manufactured from translucent ABS or polycarbonate.

16. The sign according to claim 14, wherein a power source is activated when switching on headlights, when switching on side clearance lamps, when switching on interior lighting, when braking, or in dependency upon a brightness sensor.

17. The sign according to claim 10, wherein the base has a galvanized or painted surface coating.

18. The sign according to claim 10, wherein the base is manufactured from translucent ABS or polycarbonate.

19. The sign according to claim 10, wherein a power source is activated when switching on headlights, when switching on side clearance lamps, when switching on interior lighting, when braking, or in dependency upon a brightness sensor.

20. A sign for a vehicle comprising:
    a three-dimensional base equipped with an opaque surface coating, a rear side of the base placeable on and attachable to a vehicle part, and
    an indirect lighting device with which the sign is equipped,
    wherein the base is manufactured from translucent ABS or polycarbonte.

21. The sign according to claim 20, wherein a power source is activated when switching on headlights, when switching on side clearance lamps, when switching on interior lighting, when braking, or in dependency upon a brightness sensor.

22. A sign for a vehicle comprising:
    a three-dimensional base equipped with an opaque surface coating, a rear side of the base being placeable on and attachable to a vehicle part, and
    an indirect lighting device with which the sign is equipped,
    wherein the indirect lighting device affects a peripheral surface edge that is arranged between the rear side and a front side of the three-dimensional base, and
    wherein the base is manufactured from translucent ABS or polycarbonate.

23. A sign for a vehicle comprising:
    a three-dimensional base equipped with an opaque surface coating, a rear side of the base being placeable on and attachable to a vehicle part, and
    an indirect lighting device with which the sign is equipped,
    wherein the base has a galvanized or painted surface coating, and
    wherein the base is manufactured from translucent ABS or polycarbonate.

24. A process of using a sign for a vehicle which is recognizable at dawn, dusk, or in the dark, which includes a three dimensional base equipped with an opaque surface coating, a rear side of the base being placed on and directly attached to a vehicle part, and which is equipped with an indirect lighting device, comprising activating a power source for the sign.

25. The process according to claim 24, wherein the power source is activated when switching on headlights, when switching on side clearance lamps, when switching on interior lighting, when braking, or in dependency upon a brightness sensor.

* * * * *